United States Patent
Wald et al.

[11] Patent Number: 5,847,111
[45] Date of Patent: Dec. 8, 1998

[54] ALUMINUM PHTHALOCYANINE REACTIVE DYES

[75] Inventors: Roland Wald, Huningue, France; Markus Gisler, Rheinfelden, Switzerland

[73] Assignee: Clariant Finance (BVI) Limited, Tortola, Virgin Islands (Br.)

[21] Appl. No.: 763,640

[22] Filed: Dec. 11, 1996

Related U.S. Application Data

[63] Continuation-in-part of Ser. No. 490,373, Jun. 14, 1995, abandoned.

[30] Foreign Application Priority Data

Jun. 15, 1994 [DE] Germany .......... 44 20 764.6

[51] Int. Cl.⁶ .......... C09B 62/026; C09B 47/24
[52] U.S. Cl. .......... 540/125; 540/126; 540/122; 540/140; 540/123; 540/131; 8/661; 534/627
[58] Field of Search .......... 540/122, 123, 540/126, 125, 127, 131, 135, 140

[56] References Cited

U.S. PATENT DOCUMENTS

| | | | |
|---|---|---|---|
| 4,166,718 | 9/1979 | Reinert et al. | 8/111 |
| 4,318,883 | 3/1982 | Polony | 422/22 |
| 4,530,924 | 7/1985 | Polony | 514/191 |
| 4,548,610 | 10/1985 | Preiswerk | 8/101 |
| 4,900,812 | 2/1990 | Moser et al. | 534/627 |
| 5,051,501 | 9/1991 | Schündeütte | 540/125 |
| 5,126,443 | 6/1992 | Moser et al. | 540/125 |
| 5,166,338 | 11/1992 | Büch et al. | 540/140 |
| 5,282,896 | 2/1994 | Tsuchida et al. | 540/140 |
| 5,420,256 | 5/1995 | Eizenhofer et al. | 534/618 |
| 5,453,501 | 9/1995 | Jäger | 540/126 |

FOREIGN PATENT DOCUMENTS 0 036 522 A2 9/1981 European Pat. Off. .
0 418 792 A1 3/1991 European Pat. Off. .
0 611 259 A1 8/1994 European Pat. Off. .

OTHER PUBLICATIONS

Great Britain Search Report dated Sep. 7, 1995.
French Search Report dated Dec. 13, 1996.
Form PTO 1449 filed on Jan. 8, 1998 (considered and initialled by Examiner Sripada on Mar. 25, 1998).
Form PTO 1449 filed on Jan. 8, 1998 (considered and initialled by Examiner Sripada on Jan. 20, 1998).
Form PTO 1449 filed on Nov. 14, 1997 (considered and initialled by Examiner Sripada on Dec. 18, 1997).

*Primary Examiner*—Mukund J. Shah
*Assistant Examiner*—Pavanaram K Sripada
*Attorney, Agent, or Firm*—Scott E. Hanf

[57] ABSTRACT

Novel aluminium phthalocyanine compounds of having the formula

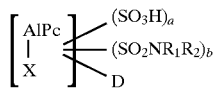

and their salts
wherein D represents —$SO_2NR_a$—A—$SO_2$—B or

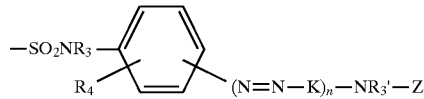

—$SO_2B$ is a fiber-reactive group and Z is a heterocyclic fiber-reactive group having 1 or 2 labile halogens selected from fluorine or chlorine.

The novel aluminium phthalocyanine compounds and their salts are fiber-reactive dyestuffs useful in dyeing or printing hydroxy-group-containing or nitrogen-containing organic substrates.

18 Claims, No Drawings

ALUMINUM PHTHALOCYANINE REACTIVE DYES

This is a continuation-in-part application of application Ser. No. 08/490,373 filed Jun. 14, 1995 abandoned.

This invention relates to aluminium phthalocyanines, methods of producing the same and their use as fiber-reactive dyestuffs.

The invention provides in one of its aspects a phthalocyanine fiber-reactive dyestuff which is a compound according to the formula (I)

$$\left[ \begin{array}{c} AlPc \\ | \\ X \end{array} \right. \left. \begin{array}{c} (SO_3H)_a \\ (SO_2NR_1R_2)_b \\ D \end{array} \right]$$

or a salt thereof wherein
Pc is a phthalocyanine radical,
X is hydroxyl or chlorine,
$R_1$ and $R_2$ independently of each other are hydrogen, substituted or unsubstituted alkyl having 1 to 6 carbon atoms or together are an alkylene chain having 4 or 5 carbon atoms which may therein contain —O— or —NH—,
a is 1, 2 or 3
b is 0, 1 or 2
D is —$SO_2NR_a$—A—$SO_2$—B or $$-SO_2NR_3 - \underset{R_4}{\underset{|}{\bigcirc}} - (N=N-K)_n - NR_3' - Z$$

wherein

A is an alkylene group or an alkylene group having one or more hetero-atoms selected from the group consisting of oxygen, nitrogen and sulphur, preferably in the alkylene chain such that each heteroatom is connected to two alkylene group carbon atoms, or either of these groups substituted with a group selected from hydroxyl, —COOH, —$SO_3H$, —$OSO_3H$ and —$SO_2$—B wherein B is defined hereinbelow; an arylene group unsubstituted or substituted with a group selected from hydroxyl, halogen selected from F, Cl or Br, $C_{1-4}$ alkyl, $C_{1-4}$ alkoxy, —$SO_3H$ and —COOH; a phenylene azophenylpyrazolaryl group according to the formula $$-\underset{R_4}{\underset{|}{\bigcirc}}-N=N-\underset{R_5}{\overset{R_6}{\underset{|}{\bigcirc}}}-\underset{N}{\overset{N}{\underset{|}{N}}}-\underset{}{\bigcirc}-$$

or a triazine group according to the formula $$\begin{array}{c} Z' \\ | \\ N \overset{\diagup}{\phantom{x}} \overset{\diagdown}{\phantom{x}} N \\ -R_{12}-N \phantom{xx} N-R_{12}- \\ | \phantom{xxxxx} | \\ R_{13} \phantom{xxxx} R_{13} \end{array}$$

wherein Z' is a hydroxyl group, a halogen atom or an amino group $NR_1R_2$ or a pyridinium group $$-{}^+N\underset{}{\underset{}{\bigcirc}}(R_{14})_{1,2}$$

wherein $R_{14}$ is —$SO_3H$ or —COOH,
each $R_{12}$ is independently a divalent group selected from alkylene, oxaalkylene, arylene and aralkylene,
each $R_{13}$ is independently a hydrogen atom, an alkyl group having 1 to 4 carbon atoms, or a hydroxyalkyl group having 2 to 4 carbon atoms,
—$SO_2$—B is a fiber-reactive group, wherein B is a group selected from —CH=$CH_2$, —$CH_2CH_2$—Y, —CH=CH—Y and
—CH($CH_2Y$)—$CH_2Y$ wherein Y represents a hydroxyl group or a group selected from halogen, —$OSO_3H$, —$SO_3H$, —$OPO_3H_2$, —$SSO_3H$, —$OCOCH_3$, —$OCOC_6H_5$, —OCO($CH_2$)$_2$—COOH, —OCO—CH=CH—COOH, —OCO—$C_6H_4$—COOH, —OCO—COOH, —$OSO_2CH_3$, a quaternary nitrogen group, or a bivalent group selected from —OCO—COO—*, —OCO—($CH_2$)$_2$—COO—*, —OCO—CH=CH—COO—* and OCO—$C_6H_4$—COO—*, wherein the bond marked with an asterisk is connected to a group Q and Q is a radical of the formula $$\left[ \begin{array}{c} AlPc \\ | \\ X \end{array} \right. \left. \begin{array}{c} (SO_3H)_a \\ (SO_2NR_1R_2)_b \\ D'- \end{array} \right.$$

wherein
D' is —$SO_2NR_a$—A—$SO_2$—B'—, attached to Pc at S,
B' is —$CH_2CH_2$—, —CH=CH— or —CH($CH_2Y$)—$CH_2$—, and Pc, X, $R_1$, $R_2$, $R_a$, A, Y, a and b are as hereinabove defined provided that X, $R_1$, $R_2$, $R_a$, A, Y, a and b need not be identical,
$R_a$ is a hydrogen atom, an alkyl group having 1 to 4 carbon atoms, a hydroxyalkyl group having 2 to 4 carbon atoms or a group —A—$SO_2$—B,
$R_3$ and $R_3'$ independently of each other are hydrogen, or alkyl which may be substituted by a hydroxyl, halogen, —$SO_3H$, —$OSO_3H$ or —COOH, p1 $R_4$ is hydrogen, halogen e.g. F, Cl or Br, OH, —COOH, —$SO_3H$, alkyl or alkoxy,
n is 0 or 1, K is a radical of formula $K_1$ or $K_2$

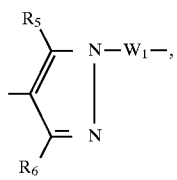 (K₁)

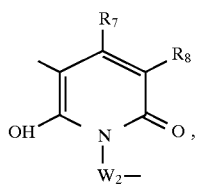 (K₂)

$R_5$ is a hydroxyl or amino group, $R_6$ is alkyl, e.g. methyl, or $COR_9$, $R_7$ is hydrogen, alkyl, $C_{5-6}$—cycloalkyl, phenyl or phenylalkyl, wherein the phenyl radical and the phenylalkyl radical may bear up to 3 substituents, including up to three from the group consisting of halogen and alkyl, up to two from the group consisting of —COOH and —SO₃H and/or one from the group consisting of alkoxy, $COR_9$, —alkylene—SO₃H, alkylene—O—SO₃H and alkylene—$COR_9$, $R_8$ signifies hydrogen, —CN, —CONH₂ or —SO₂NH₂, $R_9$ is independently a hydroxyl, amino or alkoxy group, $W_1$ signifies a divalent bridging member which may be an alkylene group having 2, 3 or 4 carbon atoms, or an unsubstituted or substituted arylene group, $W_2$ signifies a divalent bridging member, and Z is a heterocyclic fiber-reactive radical having one or two labile halogens selected from chlorine and fluorine, wherein, if not otherwise indicated, all the said alkyl, alkoxy and alkylene radicals contain 1, 2, 3 or 4 carbon atoms.

The invention also provides a mixture of phthalocyanine dyestuffs of the formula (I) wherein in such mixtures a+b is not greater than 3 on average.

Preferred groups $R_1$ and $R_2$ independently of each other are hydrogen or alkyl having from 1 to 4 carbon atoms unsubstituted or substituted with —OH, —OSO₃H, —SO₃H and —COOH, e.g. methyl or ethyl. When $R_1$ and $R_2$ together represent an alkylene chain having 4 or 5 carbon atoms which may therein contain —O— or —NH—, then together with the nitrogen atom to which they are bonded, they preferably form a pyrrolidine, piperidine, morpholine or piperazine ring. When $R_3$ and $R_3'$ independently of each other are alkyl it is preferable that they contain 1 or 2 C-atoms. When $R_3$ and $R_3'$ are substituted alkyl, it is preferable that they are $C_{1-3}$—alkyl and more preferably that they contain a substituent selected from the series hydroxy, —SO₃H, —OSO₃H and —COOH, of which $C_{2-3}$hydroxyalkyl is particularly preferred.

Each $R_3$ and $R_3'$ independently of the other is preferably, a hydrogen, methyl, ethyl, $C_{2-3}$hydroxyalkyl, —(CH₂)$_p$SO₃H, —(CH₂)$_p$OSO₃H or —(CH₂)$_q$COOH, wherein p is 1 or 2 and q is 1, 2 or 3, more preferably hydrogen or methyl.

Preferred group $R_4$ is hydrogen, —COOH or —SO₃H, most preferably hydrogen or —SO₃H.

Preferred group $R_6$ is methyl or —COOH.

Preferred group $R_7$ is $C_{2-2}$—alkyl, more preferably methyl.

Preferred group $R_8$ is hydrogen.

Each group $R_{12}$ is preferably an alkylene group having from 2 to 6 carbon atoms, 3-oxapentylene or a phenylene group which is unsubstituted or substituted at its meta-position or para-position with an alkyl group, an alkoxy group, —COOH or —SO₃H.

$R_{13}$ is preferably hydrogen.

Preferably when A is alkylene containing more than one hetero-atom, the hetero-atoms are the same. More preferably, when A is a hetero-atom-containing group, it contains only one such atom.

A preferred group A is an alkylene group, more preferably —(CH₂)—$_{2,3}$, an oxa-alkylene group, more preferably —(CH₂)—$_2$O—(CH₂)—$_{2,3}$, or an aza-alkylene group, more preferably —(CH₂)₂—NR₁₀—(CH₂)—₂ wherein $R_{10}$ is an alkyl group having 1 to 4 carbon atoms optionally substituted with a hydroxyl group; or a phenylene group, for example,

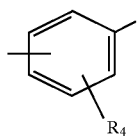

wherein $R_4$ represent a hydrogen atom, halogen atom, e.g. Cl or Br, an alkyl group having 1 to 4 carbon atoms, an alkoxy group having 1 to 4 carbon atoms, SO₃H or —COOH or OH, preferably hydrogen, halogen, $C_{1-4}$ alkyl, $C_{1-4}$ alkoxy, —SO₃H or —COOH more preferably H, —COOH or SO₃H, most preferably H or SO₃H.

A preferred group Z' is a hydroxyl group, F, Cl, Br or a group

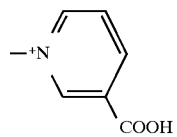

When Y is a quaternary nitrogen group it may be selected from —⁺N(CH₃)₃, or a pyridinium ion.

When the divalent bridging member $W_1$ is an arylene group it is preferably phenylene or stilben-4,4'-yl, wherein each of the phenylene nuclei of the divalent bridging member may bear a substituent, preferably a —SO₃H group.

Divalent bridging member $W_2$ is preferably unsubstituted alkylene with 2, 3 or 4 carbon atoms or said alkyene group substituted with an hydroxyl group. Arylene significances of $W_2$ include phenylene and $C_{1-2}$alkyl-phenylene. The arylene nuclei, e.g. the phenylene nuclei of the two last-mentioned groups may be substituted with a substituent which is preferably a —SO₃H group.

The arylene, e.g. phenylene nuclei in the bridging members $W_1$ and $W_2$ may bear other substituents than the preferred —SO₃H group, e.g., a chlorine, methyl, methoxy, ethoxy or a carboxy group.

Z is preferably a radical selected from the radicals $Z_1$ to $Z_9$

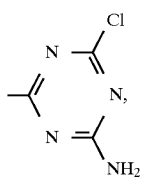 (Z₁)

-continued (Z₂) 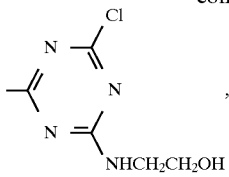

(Z₃) 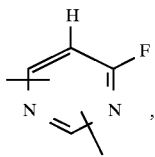

(Z₄) 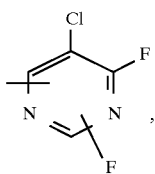

(Z₅) 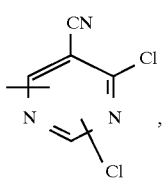

(Z₆) 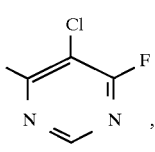

(Z₇) 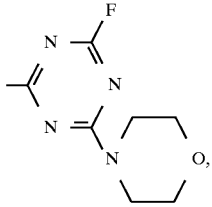

(Z₈) 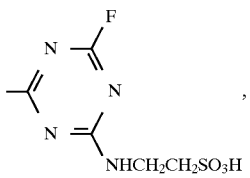

(Z₉) 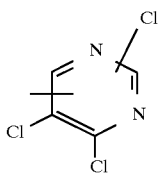

The group Z is preferably $Z_1$, $Z_3$ or $Z_7$, more preferably $Z_1$. In a dyeing process, the nature of the group Z employed depends upon the temperature at which dyeing is carried out. When the dyeing temperature is from 30° to 80° C., preferably 50°to 80° C., more preferably 50° to 60° C., the group Z may be $Z_3$, $Z_4$, $Z_5$, $Z_7$ and $Z_8$, more preferably $Z_3$ and $Z_7$. When the dyeing temperature is from 80° to 100° C. the group Z may be $Z_1$, $Z_2$, $Z_6$ and $Z_9$, more preferably $Z_1$.

All alkyl, alkoxy and alkylene radicals aforementioned, insofar as they contain more than 2 carbon atoms, may be straight—chain, branched or cyclic. Insofar as they contain hetero-atoms, i.e. oxygen, nitrogen or sulphur atom, it is preferable for neither two oxygen atoms or nitrogen atoms, nor one oxygen atom and one nitrogen atom, to be bonded to a particular carbon atom.

A particularly preferred phthalocyanine fiber-reactive dyestuff is a compound according to the formula (I) may be represented by the formula

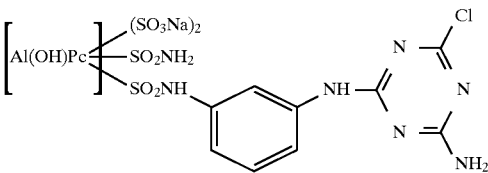

Another particularly preferred phthalocyanine compound according to the formula (I) is represented by the formula

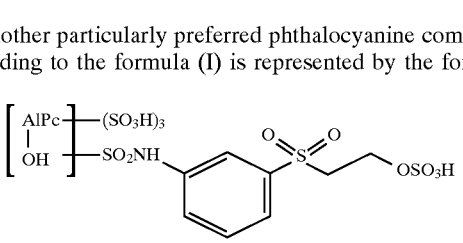

When a compound of the formula (I) is in salt-form, the nature of the cation associated with the compound is not critical and may be any of those non-chromophoric cations in the field of fiber-reactive dyestuff chemistry provided that the salt form is substantially water soluble.

Examples of suitable cations are the alkali metal cations and the ammonium cations.

The invention provides in another of its aspects a process of forming compounds according to the formula (I) wherein D is a group —SO₂NR$_a$—A—SO₂—B and their salts comprising the steps of reacting a compound of the formula (Ia)

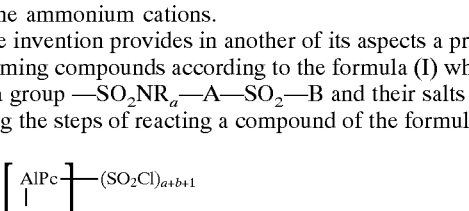

with one equivalent of a compound of the formula

HNR$_a$—A—SO₂—B and b equivalents of a compound of the formula

HNR₁R₂ and thereafter hydrolysing the remaining SO₂Cl group or groups.

The sequence in which the reagents HNR$_a$—A—SO₂—B and HNR₁R₂ are reacted is critical when A contains aromatic functionality. In any case, it is generally preferred if the reaction proceeds initially with the reaction of one equivalent of HNR$_a$—A—SO₂—B followed by reaction of b equivalents of HNR₁R₂.

Reaction of a compound Ia with HNR$_a$—A—SO₂—B is preferably carried out at a pH of from 3 to 7 and at a temperature of from 0° to 40° C. Reaction of HNR₁R₂ with the product of the afore-mentioned reaction is preferably conducted at a pH of from 5 to 9 and at a temperature of from 0° to 40° C. Preferably, the reactions are carried out in aqueous media.

The hydrolysis step is carried out in an aqueous medium under acidic or basic conditions and is preferably carried out at a pH of from 0 to 4 and at a temperature of from 0° to 20° C. or a pH of 10 to 11 and at a temperature of from 40° to 100 °C.

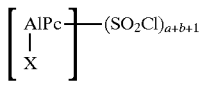 (Ia)

When the group A contains an azo chromophore it is preferred to employ a modification of the process hereinabove described comprising the steps of reacting a compound of the formula (Ia) with one equivalent of

and b equivalents of

and hydrolysing the remaining $SO_2Cl$ group or groups to form an intermediate compound according to the formula (IIa)

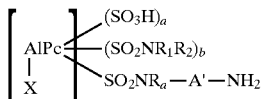 (IIa)

wherein A'—$NH_2$ represents a precursor of A such that when A'—$NH_2$ is diazotised and the diazonium salt thus formed is coupled with a suitable coupling component the group —A—$SO_2$—B is formed.

The primary amino group connected to A' of the compound (IIa) is diazotised according to conventional methods and the resultant diazonium salt coupled with a suitable coupling component, for example,

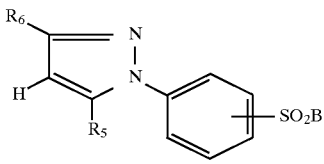

to form a compound according to the formula (I).

Similarly, when the group A contains a triazine group, an intermediate compound (IIa)

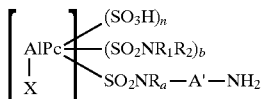 (IIa)

wherein A' represents $R_{12}$, is formed which is thereafter reacted with a compound according to the formula

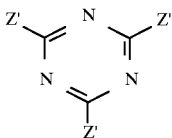

wherein at least two Z' are represented by fluorine or chlorine, more preferably fluorine to form a compound

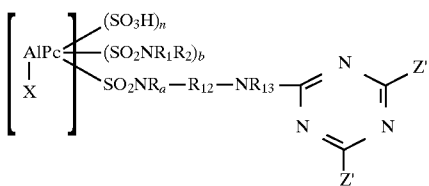

which in turn is reacted with one equivalent of $HNR_{13}$—$R_{12}$—$SO_2B$ according to conventional methods to form a compound according to the formula (I).

In an alternative embodiment, compounds of the formula (I) wherein D is

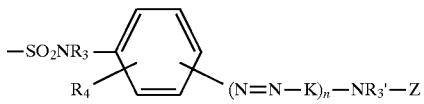

may be formed when a compound of formula II

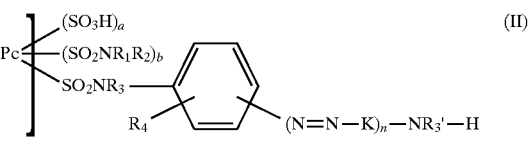 (II)

is condensed with a compound of formula III

Z—Hal    III, wherein Hal is fluorine or chlorine, or with a mixture of such compounds of formula III.

The reaction of the compound of formula II with the compound Z—Hal is conveniently carried out at 0°–40° C., preferably 0°–20° C., and at pH 4–9, preferably 5–7. Water normally serves as the reaction medium.

The starting compounds of formula II and Z—Hal are either readily available or may be obtained by conventional syntheses.

Isolation of the compounds of formula I may be effected in a manner known in the art, e.g., the compounds may be separated from the reaction mixture by means of conventional salting out with alkali metal salts, filtered off and dried, optionally in a vacuum, at a slightly elevated temperature. Depending on the reaction and isolation conditions, a compound of formula I is obtained as a free acid or preferably in salt form or as a mixed salt, in which case it contains, for example, one or several of the above-mentioned cations. Salts or mixed salts may, however, also be converted from the free acid in a known manner, and vice versa, or a conventional exchange of salts may be undertaken.

The compounds of the formula (I) are obtained as isomeric mixtures according to the number and position of substituents on the phthalocyanine ring. The isomeric mixture may be used without resorting to resolving the mixture into any particular isomeric form. However, should it be desired to resolve the compound into a particular isomeric form, this may be effected using conventional separation techniques.

Compounds according to the formula (I) their salts or a mixture thereof are useful as fiber-reactive dyestuffs. They are suitable for dyeing or printing hydroxy-group-containing or nitrogen-containing organic substrates.

Accordingly, in another aspect of the invention there is provided a process of dyeing or printing hydroxy-group-containing or nitrogen-containing organic substrates wherein the dyeing or printing is carried out with compounds according to the formula (I), their salts or with mixtures thereof.

Preferred substrates may be selected from leather, and fibrous materials comprising natural or synthetic polyamides and more particularly natural or regenerated cellulose, e.g., cotton, viscose and spun rayon. The most preferred substrates are textile materials consisting of or containing cotton.

The compounds of formula (I), their salts or mixtures thereof may be employed in dyebaths or in printing pastes and dyeing or printing may be effected in accordance with methods known in the fiber-reactive dyestuffs field, for example, the exhaust dyeing process, padding, e.g., Pad-steam, pad-thermofix, pad-dry, pad-batch, pad-jig and pad-roll and conventional or ink-jet printing methods. Preferably dyeings are carried out using the exhaust dyeing method at temperatures within the range of 30° to 100° C. Dyeing is preferably carried out at a temperature of 50° to 60° C. and 80° to 100° C. and with a goods to liqour ratio (substrate to liqour) of from 1:4 to 1:30, more preferably 1:6 to 1:30, most preferably 1:10 to 1:20.

It is to be understood that reference made above or hereinafter to compounds or salts in the plural is also to include reference to compound or salt in the singular.

In yet another aspect of the invention there is provided the use of compounds according to the formula (I), their salts or mixtures thereof in dyeing or printing substrates as hereinabove described.

The compounds according to the invention and their salts have good compatibility with known fiber-reactive dyestuffs. Accordingly, the compounds of the invention, their salts or mixtures thereof may be used alone in a dyeing or printing process or as a component in a combination dyeing or printing composition comprising other reactive dyestuffs of the same class, that is, reactive dyes which possess comparable dyeing properties, e.g., fastness properties and the extent of the ability to exhaust from a dyebath onto a substrate. In particular, the dyestuffs of the invention may be employed in conjunction with certain other dyestuffs having suitable chromophores and the same or other suitable reactive groups, the proportions of a particular dyestuff in such a composition being dictated by the particular shade which is to be produced.

Compounds of the formula (I) and their salts display high exhaust and fixation yields. Moreover, any unfixed dyestuff is easily washed off the substrate. The build-up power of the compounds and their salts is also good. Dyeings and prints obtained exhibit good light fastness properties and general wet fastnesses such as fastness to washing, sea water and sweat. They are also resistant to oxidative influences, e.g., chlorinated water, hypochlorite bleach and peroxide, percarbonate or perborate containing washing liquors.

In another aspect of the invention there is provided an hydroxy-group-containing or nitrogen-containing organic substrate dyed or printed with compounds of formula (I), their salts or a mixture therof.

There now follows a series of examples which serve to illustrate the invention. In the examples, all parts are expressed as parts by weight and all temperatures are expressed as degrees celsius unless specifically indicated to the contrary.

EXAMPLE 1

20 parts of PcAlCl. 2H$_2$O were stirred in 140 parts of chlorosulphonic acid for 30 minutes at 20° to 25° C. The reaction mixture was then heated to 135° to 140° C. over 2 hours. After 4 hours the reaction mixture was cooled to room temperature using an ice bath. The suspension thus formed was filtered and washed in ice water to remove excess acid.

97 parts of the product formed by the above reaction was stirred in 300 parts of water and 100 parts of ice. Thereafter, a solution of 17.2 parts of (2'-amino ethane-1'-sulfonyl)-2-chloroethane in 100 parts of ice water was added. The pH of the resultant solution which was 1–2 was increased to 4–5 with 20% sodium hydroxide and thereafter left for 15 hours at a temperature of from 0° to 5° C. The resultant dyestuff was salted out with sodium chloride, filtered and dried at a temperature of from 40° to 50° C.

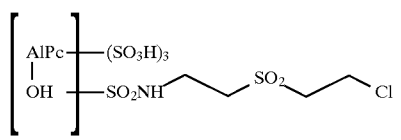

The dyestuff dyed cellulosic material, in particular cotton, to brilliant green shades with excellent wet fastness.

EXAMPLE 2

The dyestuff of Example 1 was dissolved in 0.1N sodium hydroxide. Thereafter the mixture was neutralized and the product was salted-out with sodium chloride to provide the vinyl sulphone (2).

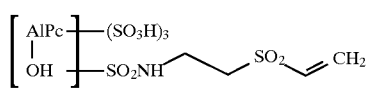

EXAMPLE 3a 97 parts of the chloroaluminium phthalocyanine sulphochloride obtained by a process described in the first paragraph of Example 1 was stirred in 300 parts of water and 100 parts of ice and thereafter was added a solution of 16.7 parts of (2'-aminopropane-1'-sulphonyl)-ethane-2-ol in 100 parts of ice water. The pH of the resultant solution which was 1–2 was adjusted to 7 with 20% sodium hydroxide and the mixture reacted for 4 hours at a temperature of from 0° to 5° C.

7 parts of a 25% ammoniacal solution was added to the reaction mixture and the pH was maintained at 7 with 20% sodium hydroxide solution. The reaction mixture was then left for a further 10 hours without cooling whereupon the pH increased to 10–11. The reaction mixture was then stirred for a further 2 hours at 60° C. to form the product 3a as a precipitate which could be filtered off. Compound 3a was isolated in its sodium salt form.

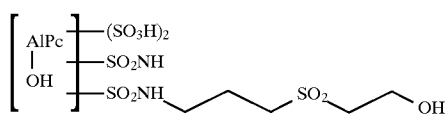

The compound 3a was converted into its sulphuric acid half ester by dissolving it in sulphuric acid. The resultant solution was stirred for one hour before being poured onto crushed ice. The pH was adjusted to 4 to 5 by adding sodium carbonate and the reactive dye 3b was isolated by spray drying.

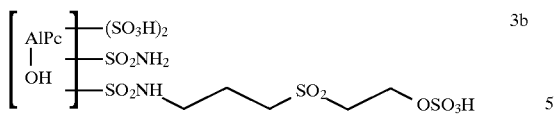

3b

This dyestuff dyed cotton to a brilliant green shade and dyeing displayed high fastness properties.

EXAMPLE 4–23

The following compounds were obtained by processes analogous to the processes described in Examples 1 to 3.

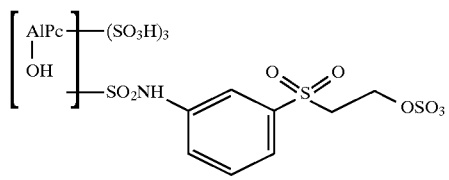

24

This dyestuff dyed cotton to brilliant green shades and dyeings displayed good fastness properties.

TABLE 1

$$\left[ \begin{array}{c} AlPc \\ | \\ X \end{array} \right. \begin{array}{l} -(SO_3H)_a \\ -SO_2N \begin{array}{c} R_1 \\ \end{array} )_b \\ \quad\quad R_2 \\ -SO_2N-A''-SO_2B \\ \quad\quad R_a \end{array} \Bigg]$$

| Ex. | X  | a | b | NR₁R₂                                                    | Rₐ                     | A*                                                        | B           |
|-----|----|---|---|----------------------------------------------------------|------------------------|-----------------------------------------------------------|-------------|
| 4   | OH | 2 | 1 | NH₂                                                      | H                      | CH₂CH₂                                                    | CH=CH₂      |
| 5   | OH | 2 | 1 | NH₂                                                      | H                      | CH₂CH₂                                                    | CH₂CH₂Cl    |
| 6   | OH | 2 | 1 | NH₂                                                      | H                      | CH₂CH₂CH₂                                                 | CH=CH₂      |
| 7   | OH | 2 | 1 | NH₂                                                      | H                      | CH₂CH₂OCH₂CH₂                                             | CH₂CH₂Cl    |
| 8   | Cl | 2 | 1 | NH₂                                                      | H                      | CH₂CH₂OCH₂CH₂                                             | CH=CH₂      |
| 9   | OH | 2 | 1 | NH₂                                                      | CH₂CH₂SO₂CH=CH₂        | CH₂CH₂                                                    | CH=CH₂      |
| 10  | OH | 2 | 1 | NHCH₃                                                    | H                      | CH₂CH₂                                                    | CH₂Cl       |
| 11  | OH | 2 | 1 | NH₂                                                      | H                      | CH₂CH₂CH₂*<br>\|<br>CH₂CH<br>\|<br>SO₂CH₂CH₂Cl            | CH₂CH₂Cl    |
| 12  | OH | 2 | 1 | NH₂                                                      | H                      | CH₂CH₂CH₂*<br>\|<br>CH₂CH<br>\|<br>SO₂CH=CH₂              | CH=CH₂      |
| 13  | OH | 2 | 1 | NHCH₂CH₂OH                                               | H                      | CH₂CH₂                                                    | CH=CH₂      |
| 14  | OH | 2 | 1 | NHCH₂CH₂OSO₃H                                            | H                      | CH₂CH₂                                                    | CH₂CH₂OSO₃H |
| 15  | OH | 2 | 1 | NHCH₂CH₂SO₃H                                             | H                      | CH₂CH₂                                                    | CH=CH₂      |
| 16  | OH | 2 | 1 | N(CH₃)CH₂CH₂SO₃H                                         | H                      | CH₂CH₂                                                    | CH=CH₂      |
| 17  | OH | 2 | 1 | morpholino (N-CH₂CH₂-O-CH₂CH₂)                           | H                      | CH₂CH₂                                                    | CH=CH₂      |
| 18  | OH | 2 | 1 | N(CH₃)CH₂CH₂OH                                           | H                      | CH₂CH₂OCH₂CH₂                                             | CH=CH₂      |
| 19  | OH | 2 | 1 | NHCH₂CH₂OH                                               | H                      | CH₂CH₂                                                    | CH=CH₂      |
| 20  | OH | 2 | 0 |                                                          | H                      | CH₂CH₂OCH₂CH₂                                             | CH=CH₂      |
| 21  | OH | 2 | 0 |                                                          | H                      | CH₂CH₂                                                    | CH=CH₂      |
| 22  | OH | 3 | 0 |                                                          | H                      | CH₂CH₂CH₂                                                 | CH₂CH₂Cl    |
| 23  | OH | 3 | 0 |                                                          | H                      | CH₂CH₂OCH₂CH₂                                             | CH₂CH₂Cl    |

EXAMPLE 24

In an analogous process to that of Example 1, 28.1 parts of 3'-aminobenzosulphonyl)-2-sulphatoethane were substituted for (2'-aminoethane-1'-sulphonyl)-2-chloroethane used in Example 1 to obtain a dyestuff having the formula 24

EXAMPLE 25

By dissolving dyestuff 24 in 0.1N sodium hydroxide and thereafter neutralizing and isolating the product obtained therefrom, dyestuff 25 was formed.

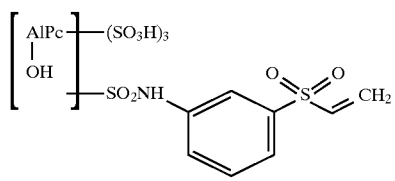

25

In the alternative, this dyestuff was formed directly by employing, in a method according to Example 1, 18.3 parts of (3'-aminobenzol-1'-sulphonyl)-ethene instead of (2'-aminoethane-1-sulphonyl)-2-chloroethane.

EXAMPLE 26 a

In a process analogous to Example 3a, one employed 20.1 parts of (4'-aminobenzol-1'-sulfonyl)-ethane-2-ol instead of (2'aminopropane-1'-sulfonyl)-ethan-2-ol to obtain the hydroxy compound 26a.

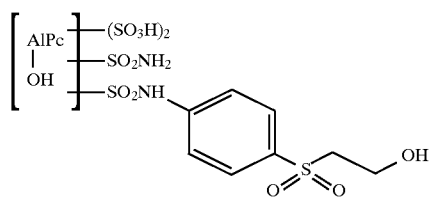

26a

EXAMPLE 26 b–d

Starting from the compound 26a, the reactive dye 26b was prepared by the following method: 106 parts of finely ground hydroxy dyestuff 23a were suspended in 500 parts of thionyl chloride and the mixture heated to the boil. After evolution of gas had ceased, excess thinyl chloride was distilled off. The residue was dissolved in water and the pH adjusted to 5–6 with sodium carbonate. The reactive dye 26b was salted out with sodium chloride.

The reactive dye 26c was obtained according to a process analogous with Example 3b. The vinyl sulphone dyestuff 26d was obtained according to a method described in Example 2.

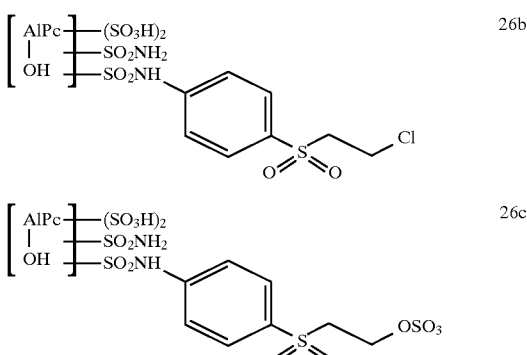

EXAMPLE 27–44

By processes analogous to those described above, other fiber-reactive dyestuffs 27–44 can be produced.

TABLE 2

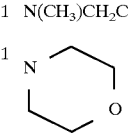

| Ex. | X | a | b | NR₁R₂ | R₄ (Pos.) | SO₂B (Pos.) |
|---|---|---|---|---|---|---|
| 27 | OH | 2 | 1 | NH₂ | H | SO₂CH₂CH₂OSO₃H (3) |
| 28 | OH | 2 | 1 | NH₂ | H | SO₂CH=CH₂ (3) |
| 29 | OH | 2 | 1 | NHCH₂CH₂OH | H | SO₂CH₂CH₂OSO₃H (4) |
| 30 | OH | 2 | 1 | NHCH₂CH₂OH | H | SO₂CH₂CH₂OSO₃H (3) |
| 31 | OH | 2 | 1 | NHCH₂CH₂SO₃H | H | SO₂CH₂CH₂OSO₃H (4) |
| 32 | OH | 2 | 1 | N(CH₃)CH₂CH₂SO₃H | H | SO₂CH₂CH₂OSO₃H (3) |
| 33 | OH | 2 | 1 | N morpholine | H | SO₂CH=CH₂ (4) |
| 34 | OH | 2 | 1 | N(CH₃)CH₂CH₂OH | H | SO₂CH₂CH₂OSO₃H (4) |
| 35 | OH | 2 | 1 | N(CH₃)CH₂CH₂OH | H | SO₂CH₂CH₂OSO₃H (3) |
| 36 | OH | 2 | 1 | NHCH₂CH₂(OH)CH₃ | H | SO₂CH₂CH₂OSO₃H (4) |
| 37 | OH | 2 | 1 | NHCH₂CH₂CH₂OH | H | SO₂CH₂CH₂OSO₃H (4) |
| 38 | OH | 2 | 1 | NHCH₂CH₂CH₂OH | H | SO₂CH₂CH₂OSO₃H (3) |
| 39 | OH | 2 | 1 | NHCH₂CH₂COOH | H | SO₂CH₂CH₂OSO₃H (4) |
| 40 | OH | 1 | 0 | — | SO₃H (2) | SO₂CH₂CH₂OSO₃H (5) |
| 41 | OH | 1 | 0 | — | SO₃H (2) | SO₂CH₂CH₂OSO₃H (4) |
| 42 | OH | 2 | 0 | — | H | SO₂CH₂CH₂OSO₃H (3) |
| 43 | OH | 2 | 0 | — | H | SO₂CH₂CH₂OSO₃H (4) |
| 44 | OH | 3 | 0 | — | H | SO₂CH₂CH₂OSO₃H (4) |

EXAMPLE 45

97 parts of a chloro aluminium phthalocyanine tetrasulphochloride formed according to a method described in the first paragraph of Example 1 were stirred in 300 parts of water and 100 parts of ice. Thereafter, a solution of 14.5 parts of 1,3-diaminobenzol-monohydrochloride in 100 parts of ice water were added. The pH of the resultant solution which was 1–2 was adjusted to 4 with 20% sodium hydroxide and the reaction mixture was maintained at 0 to 5° C. for 4 hours.

Thereafter, the reaction mixture was adjusted to pH 10–11 by adding 20% sodium hydroxide and left to stir for a further 2 hours at 60° C. The product was salted out of solution using sodium chloride and the precipitate filtered to provide a product 45a in its sodium salt form.

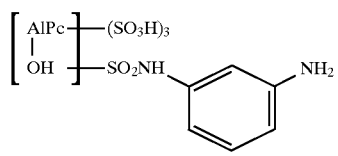

97 parts of the dyestuff having a formula 45a was were suspended in a mixture of 500 parts of water and 25 parts of 30% hydrochloric acid. To the resultant suspension was added 100 parts of ice and diazotisation was effected by the addition of 7 parts of sodium nitrite. Thereafter, 36 parts of 1-(3'-sulphatoethylsulphonylphenyl)-3-methyl-5-pyrazolon were added to the aqueous suspension of the diazonium salt previously formed. The mixture was stirred at room temperature and the pH maintained at 6 to 7 by addition of sodium carbonate until dye formation was completed. The dyestuff obtained had the following formula

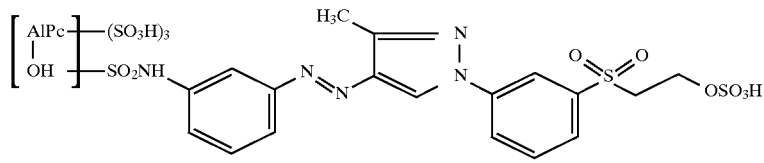

The dyestuff dyed cotton to a brilliant green shade and dyeings displayed excellent fastness properties.

EXAMPLE 46

97 parts of the chloro aluminium phthalocyanine tetra-sulphochloride prepared according to the method described in the first paragraph of Example 1 was stirred in 300 parts of water and 100 parts of ice. To this solution there was added a solution of 14.5 parts of 1,3-diaminobenzol-monohydrochloride in 100 parts of ice water. The pH of the resultant solution was 1–2 and it was adjusted to a pH of 4 with 20% sodium hydroxide and allowed to stand for 4 hours at a temperature of between 0° and 5° C.

Thereafter, 7 parts of a 25% ammoniacal solution was added to the reaction mixture, the pH was adjusted to 7 to 8 by adding 20% sodium hydroxide and the reaction mixture left for 10 hours. Thereafter, the pH was 10–11 and the reaction mixture was stirred at 60° C. for 2 hours whereupon the product was formed as a precipitate which was filtered off. The product 46a was obtained in its sodium salt form.

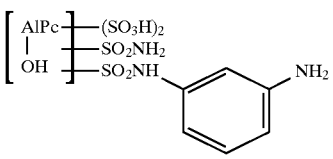

97 parts of the amino dyestuff 46a was diazotised according to the method described in Example 45b. Thereafter, 36 parts of 1-(3'-sulphatoethylsulphonylphenyl)-5-pyrazolon-3-carboxylic acid were added to the aqueous suspension of the diazonium salt previously formed. The mixture was stirred at room temperature and the pH maintained at 6–7 by addition of sodium carbonate until dye formation was completed. After the dyestuff was salted out using sodium chloride, filtered off and dried 129 parts of a product 46b was obtained as a dark blue-green powder.

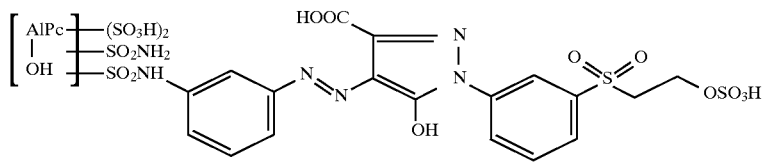

This dyestuff dyed cotton in brilliant yellow-green shade and dyeings displayed excellent fastness properties.

EXAMPLE 47

When one substitutes 18.8 parts of 2,4-diaminobenzolsulphonic for 1,3-diaminobenzol-monohydrochlorid in a process analogous to Example 46 and couple with 36 parts of 1-(3'-sulphatoethylsulphonylphenyl)-3-methyl- 5-pyrazolone one obtained a dyestuff 47.

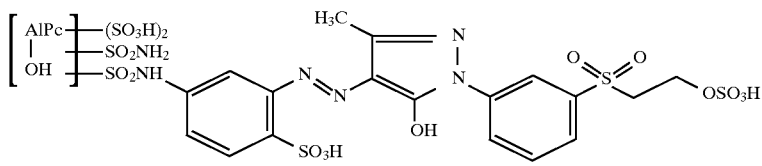

47

EXAMPLES 48–58

The following fibre-reactive dyestuffs were formed by employing processes analogous to those decribed in Examples 45 to 47.

EXAMPLE 60

97 parts of the amino dyestuff 46a was mixed in 600 parts of water and 13.5 parts of 2,4,6-trifluorotriazine were added at a temperature of from −5° to −10° C. The solution was

TABLE 3

| Ex. | X | a | b | $NR_1R_2$ | $R_4$ (Pos.) | −N=N Pos. | $R_6$ | $SO_2B$ (Pos.) |
|---|---|---|---|---|---|---|---|---|
| 48 | OH | 2 | 0 | — | H | 3 | $CH_3$ | $SO_2CH_2CH_2OSO_3H$ (4) |
| 49 | OH | 3 | 0 | — | H | 3 | $CH_3$ | $SO_2CH_2CH_2OSO_3H$ (4) |
| 50 | OH | 2 | 0 | — | H | 3 | COOH | $SO_2CH_2CH_2OSO_3H$ (3) |
| 51 | OH | 2 | 0 | — | $SO_3H$ (4) | 3 | $CH_3$ | $SO_2CH_2CH_2OSO_3H$ (4) |
| 52 | OH | 2 | 0 | — | $SO_3H$ (6) | 3 | $CH_3$ | $SO_2CH_2CH_2OSO_3H$ (4) |
| 53 | OH | 2 | 0 | | $SO_3H$ (3) | 4 | COOH | $SO_2CH=CH_2$ (4) |
| 54 | OH | 2 | 1 | $NH_2$ | $SO_3H$ (4) | 3 | COOH | $SO_2CH_2CH_2OSO_3H$ (3) |
| 55 | OH | 2 | 1 | $NH_2$ | $SO_3H$ (4) | 3 | $CH_3$ | $SO_2CH_2CH_2OSO_3H$ (4) |
| 56 | OH | 2 | 1 | $NHCH_2CH_2OH$ | H | 3 | COOH | $SO_2CH=CH_2$ (4) |
| 57 | OH | 2 | 1 | $NHCH_2CH_2SO_3H$ | H | 3 | $CH_3$ | $SO_2CH_2CH_2OSO_3H$ (3) |
| 58 | OH | 2 | 1 | morpholino | H | 3 | COOH | $SO_2CH_2CH_2OSO_3H$ (4) |

EXAMPLE 59

97 parts of the amino dyestuff of Example 45a was mixed with 600 parts of ice water and 18.4 parts of 2,4,6-trichlorotriazine were added with good stirring. The pH was adjusted to 6–6.5 over 3 hours with 20% sodium hydroxide. To this mixture was added a solution of (3'-aminobenzolsulphonyl)- 2-sulphatoethane in 100 parts of water and the resulatant mixture was stirred for 4 hours whilst being maintained at a pH of 6–6.5 with a 15% sodium bicarbonate solution. After salting the product out of solution with sodium chloride, filtering and drying a compound 59 was obtained.

stirred for 3 hours and was maintained at a pH of 5 to 6 with 20% sodium hydroxide. A solution of 17.2 parts of (2'-aminoethane-1'-sulphonyl)-2-chloroethane in 100 parts of ice water was added to the reaction mixture. The resultant mixture was stirred for 4 hours and the pH maintained at 6.5 to 7 with 20% sodium hydroxide. After salting the product out of solution using sodium chloride, filtering and drying, the product 60 was obtained.

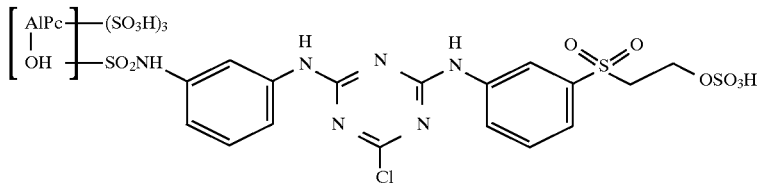

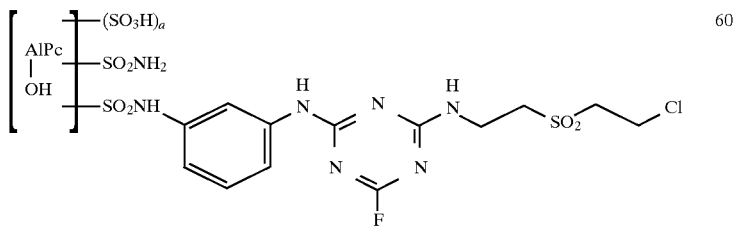

EXAMPLE 61

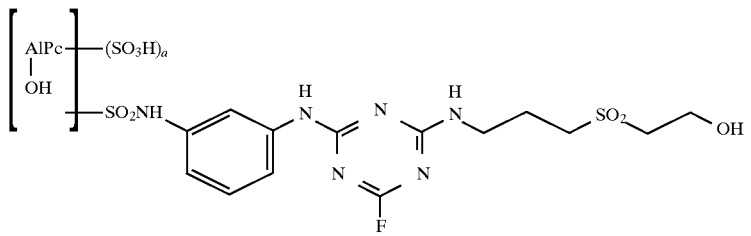

97 parts of the amino dyestuff 45a was mixed in 600 parts of ice water and 13.5 parts of 2,4,6-trifluorotriazine were added at a temperature of from −5° to −10° C. The solution was stirred for 3 hours and was maintained at a pH of 5 to 6 with 20% sodium hydroxide. A solution of 16.7 parts of (2'-aminopropane-1'-sulphonyl)-ethane-2-ol in 100 parts of ice water was added to the reaction mixture. The resultant mixture was stirred for 4 hours and the pH maintained at 6.5 to 7 with 20% sodium hydroxide. After salting the product out of solution using sodium chloride, filtering and drying, the product 61a was obtained.

This intermediate was converted to the sulphuric acid half ester 61b according to the method of EXAMPLE 3b.

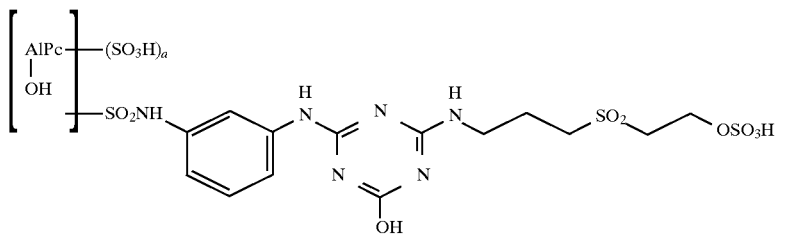

EXAMPLE 62–73

The following fiber-reactive dyestuffs were obtained following the method of Examples 59 to 61.

TABLE 4

$$\left[ AlPc \underset{X}{|} \begin{matrix} (SO_3H)_a \\ SO_2N\begin{smallmatrix}R_1\\R_2\end{smallmatrix})_b \\ SO_2NH \end{matrix} \right] \begin{matrix} {}^2 \\ {}_3 \\ {}_4 \\ R_4 \end{matrix} \underset{R_{13}}{N} \underset{N}{\overset{Z'}{\underset{}{\bigvee}}} \underset{R_{13}'}{N} - R_{12}' - SO_2B$$

| Ex. | X | a | b | NR$_1$R$_2$ | R$_4$ (Pos.) | NR$_{13}$ (Pos.) | Z' | NR$_{12}$'R$_{13}$' | SO$_2$B |
|---|---|---|---|---|---|---|---|---|---|
| 62 | OH | 3 | 0 | — | H | NH (3) | F | NHCH$_2$CH$_2$CH$_2$ | SO$_2$CH$_2$CH$_2$OSO$_3$H |
| 63 | OH | 3 | 0 | — | H | NH (3) | F | NHCH=CH$_2$ | SO$_2$CH=CH$_2$ |
| 64 | OH | 3 | 0 | — | SO$_3$H(4) | NH(3) | Cl | 3-methylphenyl-NH- | SO$_2$CH$_2$CH$_2$OSO$_3$H |
| 65 | OH | 3 | 0 | — | SO$_3$H (6) | NH (3) | Cl | 3-methylphenyl-NH- | SO$_2$CH$_2$CH$_2$OSO$_3$H |
| 66 | OH | 3 | 0 | — | SO$_3$H (6) | NH (3) | F | 3-methylphenyl-NH- | SO$_2$CH=CH$_2$ |
| 67 | OH | 3 | 0 | — | SO$_3$H (3) | NH (3) | OH | 3-methylphenyl-NH- | SO$_2$CH$_2$CH$_2$OSO$_3$H |
| 68 | OH | 3 | 0 | — | SO$_3$H (6) | NH (3) | F | NHCH$_2$CH$_2$OCH$_2$CH$_2$ | SO$_2$CH=CH$_2$ |
| 69 | OH | 3 | 0 | — | SO$_3$H (6) | NH (3) | OH | NHCH$_2$CH$_2$OCH$_2$CH$_2$ | SO$_2$CH$_2$CH$_2$OSO$_3$H |
| 70 | OH | 2 | 1 | NH$_2$ | SO$_3$H (4) | NH (3) | Cl | 3-methylphenyl-NH- | SO$_2$CH$_2$CH$_2$OSO$_3$H |
| 71 | OH | 2 | 1 | NHCH$_2$CH$_2$OH | H | NH (3) | Cl | 3-methylphenyl-NH- | SO$_2$CH=CH$_2$ |
| 72 | OH | 2 | 1 | NHCH$_2$CH$_2$SO$_3$H | H | NH(3) | F | 3-methylphenyl-NH- | SO$_2$CH$_2$CH$_2$OSO$_3$H |
| 73 | OH | 2 | 1 | morpholino | H | NH(3) | F | 3-methylphenyl-NH- | SO$_2$CH$_2$CH$_2$OSO$_3$H |

EXAMPLE 74 a) 20 parts of PcAlCl.2H$_2$O were stirred in chlorosulphonic acid (140 parts) for 30 minutes at 20° to 25° C. The reaction mixture was then reacted to 135° to 140° C. over 2 hours. After 4 hours the reaction mixture was cooled using an ice bath. The suspension thus formed was filtered and washed in ice water to remove excess acid.

97 g of the aluminium phthalocyanine sulphochloride produced according to the method described above were stirred into 300 ml of water and 100 g of ice, and then a solution consisting of 100 ml of ice-water and 14.5 g of 1,3-diaminobenzene monohydrochloride were added. The pH value was ca. 1–2. The pH was adjusted to 4 with 20% caustic soda solution, and a temperature of around 0°–5° C.

was maintained for 4 hours. Prior to adding 7 ml of a 25% ammonia solution, the pH value was adjusted to 7.0 with 20% caustic soda solution. The mixture was stirred for 10 hours without cooling at pH 7 to 8, which was maintained by adding 20% caustic soda solution. The pH value was then adjusted to 10–11 and stirring was effected for 2 hours at 60°, before precipitating the intermediate product with sodium chloride and thereafter filtering off the precipitate. The compound thus obtained corresponds to formula

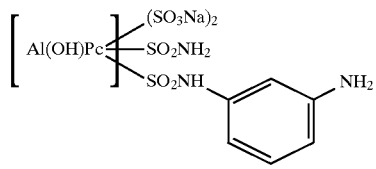

b) The intermediate product obtained according to a) was dissolved in 600 ml of ice-water and mixed with 18.4 g of cyanuric chloride with stirring. The pH value was maintained for 3 hours at 6–6.5 using 20% caustic soda solution, thereafter 7 ml of a 25% ammonia solution was added dropwise. After 4 hours, the resultant dyestuff was precipitated by adding sodium chloride, filtered off and dried in a vacuum at 40°–50°.

The dyestuff thus obtained corresponds to formula

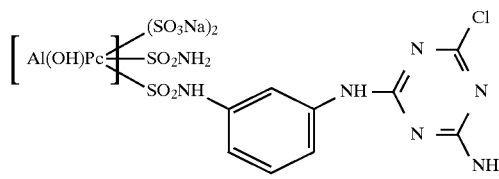

The compound thus produced dyed cellulosic material, and in particular cotton, in brilliant green shades. The dyeings thus obtained have excellent wet fastness.

EXAMPLE 75

The process was effected according to the method of Example 74b with a modification such that the ammonia solution was not added. Work-up of the dyestuff was effected by precipitation with sodium chloride and subsequent filtration.

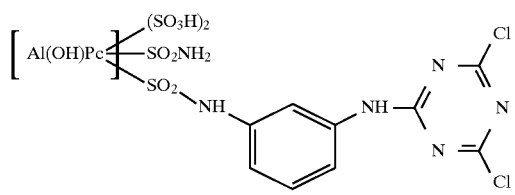

The compound of the above formula was thus obtained.

EXAMPLE 76

The process was effected according to the method of Example 74b with a modification such that the ammonia solution was not added, and instead of the cyanuric chloride mentioned in Example 74b, 17 g of 5-chloro-2,4,6-trifluoropyrimidine were used. The dyestuff of the formula

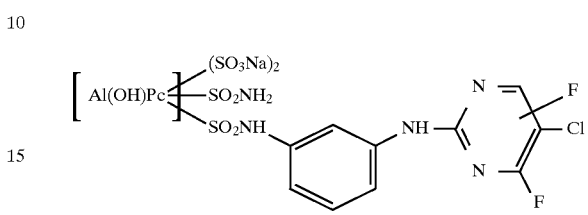

was thus obtained.

It dyes cotton in brilliant green shades with a high level of fastness.

EXAMPLES 77–88

Further aluminium phthalocyanine compounds may be produced according to processes analogous to the methods described in Examples 74 to 76:

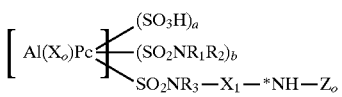

$X_O$=Cl or OH; $Z_O$ corresponds to formulae $Z_1$–$Z_8$ (above) and $R_3$ is hydrogen.

| Ex. No. | a | b | $R_1$ | $R^2$ | $X_1$ | $Z_0$ |
|---|---|---|---|---|---|---|
| 77 | 1.5 | 1 | H | H | ⌬ | * $Z_1$ |
| 78 | 1.7 | 1 | H | $CH_2CH_2OH$ | ⌬ | * $Z_2$ |
| 79 | 1.7 | 1 | H | H | ⌬ | * $Z_3$ |
| 80 | 1.5 | 1 | H | H | ⌬ | * $Z_4$ |

-continued

| Ex. No. | a | b | $R_1$ | $R^2$ | $X_1$ | $Z_0$ |
|---|---|---|---|---|---|---|
| 81 | 1.5 | 1 | H | H | (m-phenylene) | $Z_5$ |
| 82 | 2 | 1 | $CH_2CH_2OH$ | $CH_2CH_2OH$ | (m-phenylene) | $Z_6$ |
| 83 | 2.5 | 0 | — | — | (m-phenylene) | $Z_7$ |
| 84 | 1.5 | 1 | H | H | (m-phenylene) | $Z_8$ |
|  | 1.7 | 1 | H | H | (phenylene-SO$_3$H) | $Z_1$ |
| 86 | 2.5 | 0 | — | — | (phenylene-SO$_3$H) | $Z_2$ |
| 87 | 1.7 | 1 | H | H | (phenylene-COOH) | $Z_4$ |

-continued

| Ex. No. | a | b | $R_1$ | $R^2$ | $X_1$ | $Z_0$ |
|---|---|---|---|---|---|---|
| 88 | 1.5 | 1 | H | H | (phenylene-COOH) | $Z_3$ |

EXAMPLE 89

92 parts of the dyestuff base according to Example 86 (produced by sulphochlorinating aluminium phthalocyanine, and subsequently reacting it with 1,3-diaminobenzene-4-sulphonic acid, wherein the dyestuff base contains per molecule ca. 2.5 sulphonic acid groups and 1 sulphamide group) were stirred into 550 parts of water together with 7 parts of sodium nitrite. The solution which was cooled to 0°–2° C. was added in dropwise to 100 parts of ice/water and 60 parts of 30% hydrochloric acid. Whilst maintaining a temperature of 0°–5° C., the diazonium salt suspension obtained was passed into a solution consisting of 300 parts of ice/water and 20 parts of 1(3'-methylamino-hydroxy-4-methylpyridone-(2). During the coupling reaction, the pH was held at 6.5–7.5 by adding 20% caustic soda solution. The resultant green solution was mixed at 20–35° C. with 24 parts of 5-cyano-2,4,6-trichloropyrimidine. The pH was held at 7.5–8.0 by continuously adding 20% soda solution. After 3–4 hours, the reaction was complete. The solution was salted out with sodium chloride, the dyestuff precipitate filtered off by suction and dried at 40° C. The dyestuff obtained has the formula

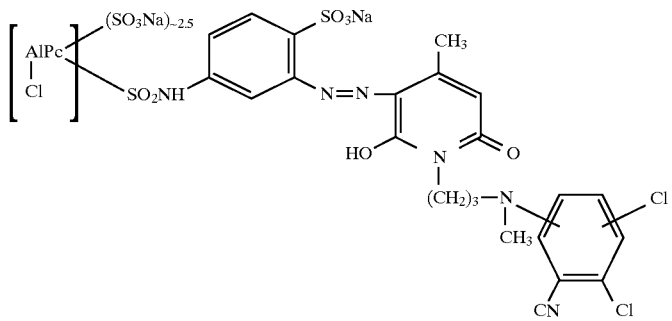

and dyes cellulosic material, and in particular cotton, in brilliant green shades. Dyeings obtained from this dyestuff display excellent wet fastness.

EXAMPLE 90

The dyestuff, which in the form of the free acid corresponds to formula

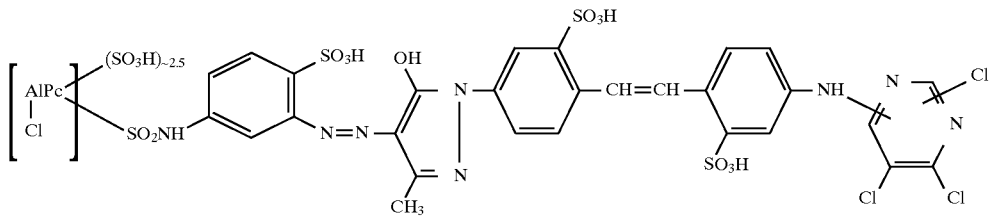

may be produced and isolated according to a method analogous to that described in Example 89, using corresponding starting compounds. With this dyestuff, brilliant green cotton dyeings, which have good wet fastness, are obtained.

In the following table are listed the absorption maxima (λmax in nm) for the dyestuffs of the Examples. The measurements were made in water.

| Ex. No. | λmax (PC) |
|---|---|
| 74b | 670 |
| 75 | 670 |
| 76 | 670 |
| 77 | 668 |
| 78 | 670 |
| 79 | 670 |
| 80 | 668 |
| 81 | 668 |
| 82 | 672 |
| 83 | 674 |
| 84 | 668 |
| 85 | 672 |
| 86 | 674 |
| 87 | 669 |
| 88 | 667 |
| 89 | 672 |
| 90 | 672 |

The following examples are illustrative of the application of the above-mentioned dyestuff.

Application Example A

To a dye bath consisting of 100 g of demineralized water, 0.25 g of the dyestuff of Example 24 and 10 g of cotton tricot (bleached) were added. The dyebath was heated to 50° C. over a 10 minutes period and maintained at this temperature for 25 minutes. Thereafter, 0.4 g of calcinated sodium carbonate and 0.3 ml of concentrated caustic soda-solution were added. After 30 minutes at 50° C. the temperature was increased to 60° C. over a 25 minutes period and dyeing was continued for 60 minutes at this temperature. The dyed cotton fabric was removed from the liquor, rinsed for 10 minutes in 500 g of demineralized water in the presence of 0.25 g of a non-ionic surfactant. Finally the cotton dyeing was rinsed and dried. The green dyeing obtained displayed good all-round fastness.

Application Example B

A printing paste having the components 40 parts of the dyestuff of the Example 24
100 parts of urea
350 parts of water -continued 500 parts of a 4% sodium alginate thickener
10 parts of sodium bicarbonate 1000 parts in all
was applied to cotton material by a conventional printing process.

The printed and dried material was steamed for 4 to 8 minutes at 102° to 105° C. and then given a cold and hot rinse. The fixed cotton material was then washed twice for 10 minutes, each time in 5000 parts of boiling, demineralized water, subsequently rinsed for 2 minutes in running, demineralized water of 60° C.±10° C., 1 minute in running tap water of 60° C.±10° C. and for 1 minute in cold tap water.

Application Example C

A dye bath consisting of 1000 parts of demineralized water, 80 parts of Glauber's salt (calcined), 1 part of sodium salt of 1-nitrobenzene-3-sulphonic acid and 2 parts of the dyestuff from Example 74b was heated over the course of 10 minutes to 80° C. Thereafter, 100 parts of mercerized cotton were added. Dyeing was effected for 5 minutes at 80° C., and heating was effected to 95° C. over 15 minutes. After 10 minutes at 95° C., 3 parts of soda were added, after 20 minutes a further 7 parts of soda, and after 30 minutes at 95° C. another 10 parts of soda were added. Dyeing subsequently continued for 60 minutes at 95° C. The dyed material was then removed from the dye bath, rinsed for 2 minutes in running, demineralized water of 60°±10°. It was then washed twice for 10 minutes, each time in 5000 parts of boiling, demineralized water, subsequently rinsed for 2 minutes in running, demineralized water of 60° C.±10° C., 1 minute in running tap water of 60° C.±10° C. and for 1 minute in cold tap water. After drying, a brilliant green cotton dyeing with good fastness was obtained.

Application Example D

A dye bath consisting of 1000 parts of demineralized water, 80 parts of Glauber's salt (calcined) and 2 parts of the dyestuff from Example 76 was heated to 60° C. over the course of 10 minutes. Then, 100 parts of mercerized cotton were added. After 25 minutes at 60° C., 0.7 parts of soda were added, after 20 minutes a further 1.3 parts of soda, and after 30 minutes at 60° C. another 2 parts of soda were added. The bath was subsequently heated to 80° C. over the course of 15 minutes, and dyeing continued for 60 minutes at 80° C. The dyed material was then removed from the dye bath, rinsed for 2 minutes in running, demineralized water of 60° C.±10° C. and for 1 minute in running tap water of 60° C.±10° C. It was then washed twice for 10 minutes, each time in 5000 parts of boiling, demineralized water, subsequently rinsed for 2 minutes in running, demineralized water of 60° C.±10° C., 1 minute in running tap water of 60° C.±10° C. and for 1 minute in cold tap water. After drying, a brilliant green cotton dyeing with good fastness was obtained.

The dyestuffs of Examples 77 to 90 or dyestuff mixtures of Examples 74b to 90 may also be used for dyeing cotton according to the method described in Examples C and D. Brilliant green dyeings were obtained, which have good fastness properties.

Application Example E

A printing paste having the components

| |
|---|
| 40 parts of the dyestuff of Example 74b |
| 100 parts of urea |
| 330 parts of water |
| 500 parts of a 4% sodium alginate thickener |
| 10 parts of sodium salt of 1-nitrobenzene-3-sulphonic acid and |
| 20 parts of soda |
| 1000 parts in all |
| was applied to cotton material by a conventional printing process. |

The printed and dried material was steamed for 4–8 minutes at 102°–105° C. and then given a cold and a hot rinse. The fixed cotton and then material was subsequently washed at the boil (analogously to Example D) and dried. The green print obtained had good all-round fastness.

The dyestuffs of Examples 75 to 90 were also used for printing cotton according to a method of Example E. In all cases, brilliant green prints with good fastness properties were obtained.

We claim:

1. A phthalocyanine fiber-reactive dyestuff which is a compound according to the formula (I)

$$\left[ \begin{array}{c} AlPc \\ | \\ X \end{array} \right] \begin{array}{c} (SO_3H)_a \\ (SO_2NR_1R_2)_b \\ D \end{array}$$

or a salt thereof
wherein
Pc is a phthalocyanine radical,
X is hydroxyl or chlorine
$R_1$ and $R_2$ independently of each other are hydrogen, substituted or unsubstituted alkyl having 1 to 6 carbon atoms or together are an alkylene chain having 4 or 5 carbon atoms which may therein contain —O— or —NH—,
a is 1,2 or 3
b is 0,1 or 2
D is —SO$_2$NR$_a$—A—SO$_2$—B, or $$-SO_2NR_3-\underset{R_4}{\underset{|}{\bigcirc}}-(N=N-K)m-NR3'-Z$$

wherein
A is an alkylene group or an alkylene group having one or more hetero-atoms selected from the group consisting of oxygen, nitrogen and sulphur in the alkylene chain such that each heteroatom is connected to two alkylene group carbon atoms, or either of these groups substituted with a group selected from hydroxyl, —COOH, —SO$_3$H, —OSO$_3$H and —SO$_2$—B wherein B is defined hereinbelow; an arylene group unsubstituted or substituted with a group selected from hydroxyl, halogen selected from F, Cl and Br, C$_{1-4}$ alkyl, C$_{1-4}$ alkoxy, —SO$_3$H and —COOH; a phenylene azophenylpyrazolary group according to the formula $$\underset{R_4}{\underset{|}{\bigcirc}}-N=N-\underset{R_5}{\overset{R_6}{\underset{|}{\bigcirc}}}\underset{|}{\overset{N}{\underset{N}{\bigcirc}}}-\bigcirc-$$

or a triazine group according to the formula $$-R_{12}-\underset{R_{13}}{\underset{|}{N}}\underset{N}{\overset{Z'}{\underset{|}{\bigcirc}}}\underset{R_{13}}{\underset{|}{N}}-R_{12}-$$

wherein Z' is a hydroxyl group, a halogen atom or an amino group NR$_1$R$_2$ or a pyridium group $$-^+N\underset{}{\overset{}{\bigcirc}}(R_{14})_{1,2}$$

wherein $R_{14}$ is —SO$_3$H or —COOH
each $R_{12}$ is independently a divalent group selected from alkylene, oxaalkylene, or arylene or araklylene,
each $R_{13}$ is independently a hydrogen atom, an alkyl group having 1 to 5 carbon atoms, or a hydroxyalkyl group having 2 to 4 carbon atoms, —SO$_2$—B is a fiber-reactive group, 1 wherein B is a group selected from —CH=CH$_2$, —CH$_2$CH$_2$—Y, —CH=CH—Y and —CH(CH$_2$Y)=CH$_2$Y wherein Y represents a hydroxyl group or a group selected from halogen, —OSO$_3$H or —SO$_3$H, —OPO$_3$H$_2$, —SSO$_3$H, —OCOCH$_3$, —OCOC$_6$H$_5$, —OCO(CH$_2$)$_2$—COOH, —OCO—CH=CH—COOH, —OCO—C$_6$H$_4$—COOH, —CO—COOH, —OSO$_2$CH$_3$, a quaternary nitrogen group, or a bivalent group selected from —OCO—COO*, —OCO—(CH$_2$)$_2$—COO—*, —OCO—CH=CH—COO—* and —OCO—C$_6$H$_4$—COO—*, wherein the bond marked with an asterisk is connected to a group Q and Q is a radical of the formula $$\left[ \begin{array}{c} AlPc \\ | \\ X \end{array} \right] \begin{array}{c} (SO_3H)_a \\ (SO_2NR_1R_2)_b \\ D'- \end{array}$$

wherein
D' is —SO$_2$NR$_a$—A—SO$_2$—B'—, attached to Pc at S
B' is —CH$_2$CH$_2$—, —CH=CH— or —CH(CH$_2$Y)—CH$_2$—, and PC X, R$_1$, R$_2$, R$_a$, A, Y, a and b are as hereinabove defined provided that D, R$_1$, R$_2$, R$_a$, A, Y, a and b need not be identical,
$R_a$ is a hydrogen atom, an alkyl group having 1 to 4 carbon atoms, a hydroxyalkyl group having 2 to 4 carbon atoms or a group —A—SO$_2$—B,
$R_3$ and $R'_3$ independently of each other are hydrogen, or alkyl which may be substituted by a hydroxyl, halogen, —SO$_3$H, —OSO$_3$H or —COOH, R$_4$ is hydrogen, halogen, OH, —COOH, —SO$_3$H, alkyl or alkoxy, n is 0 or 1, K is a radical of formula K$_1$ or K$_2$

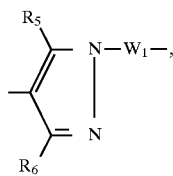
(K$_1$)

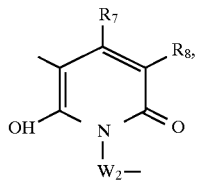
(K$_2$)

R$_5$ is a hydroxyl or amino group,

R$_6$ is alkyl or COR$_9$,

R$_7$ is hydrogen, alkyl, C$_{5-6}$-cycloaklyl, phenyl or phenylaklyl, wherein the phenyl radical and the phenylalkyl radical may bear up to 3 substituents, including up to three from the group consisting of halogen and alkyl, up to two selected from the group consisting of —COOH and —SO$_3$H and/or one from the group consisting of alkoxy, COR$_9$, —alkylene—SO$_3$H, alkylene—OSO$_3$H and alkylene—COR$_9$, R$_8$ signifies hydrogen, —CN, —CONH$_2$ or —SO$_2$NH$_2$, each R$_9$, independently of the other, signifies a hydroxyl, amino or alkoxy group, W$_1$ signifies a divalent bridging member selected from an alkylene group having 2, 3 or 4 carbon atoms or an unsubstituted or substituted arylene group, W$_2$ signifies a divalent bridging member, selected from alkylene with 2, 3 or 4 carbon atoms, which may bear a hydroxyl group, or it signifies phenylene or C$_{1-2}$ alkyl-pheneylene, and Z is a heterocyclic fiber-reactive group having one or two labile halogens selected from chlorine and fluorine and if not otherwise indicated, all the said alkyl, alkoxy and alkylene radicals contain 1, 2, 3 or 4 carbon atoms.

2. A mixture of phthalocyanine fiber-reactive dyestuffs according to claim 1 wherein a +b is not greater than 3 on average.

3. A fiber-reactive dyestuff according to claim 1 or a salt thereof wherein R$_7$ is methyl or ethyl and R$_8$ is hydrogen.

4. A fiber-reactive dyestuff according to claim 1 or a salt thereof wherein W$_1$ is a divalent bridging member which is phenylene or stilben-4,4'-yl and W$_2$ represents a divalent bridging member which is phenylene or C$_{1-2}$-alkylphenylene wherein each of the phenylene nuclei of the divalent bridging members bears a —SO$_3$H group.

5. A fiber-reactive dyestuff according to claim 1 or a salt thereof wherein Z is selected from a radical of the formula Z$_1$ to Z$_9$,

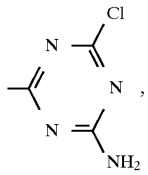
(Z$_1$)

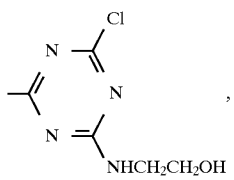
(Z$_2$)

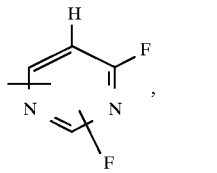
(Z$_3$)

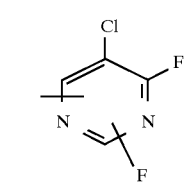
(Z$_4$)

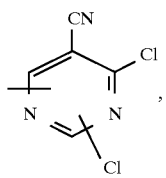
(Z$_5$)

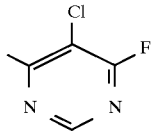
(Z$_6$)

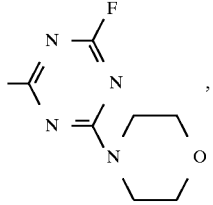
(Z$_7$)

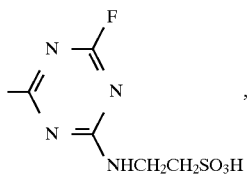
(Z$_8$)

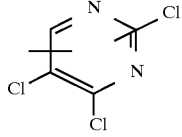
(Z$_9$)

6. A fiber-reactive dyestuff according to claim 1 or a salt thereof having the formula

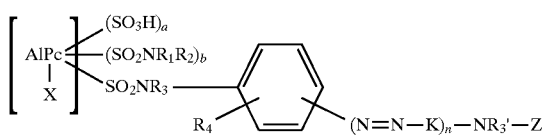

7. A fiber-reactive dyestuff according to claim 6 or a salt thereof having the formula

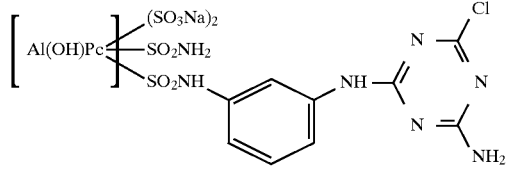

8. A fiber-reactive dyestuff according to claim 1 or a salt thereof having the formula

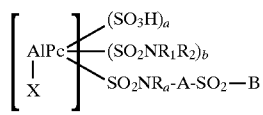

or a mixture of fiber-reactive dyestuffs according to formula (I)

wherein A, $SO_2B$, $R_1$, $R_2$, $R_1$ and $R_2$ together, X and $R_a$ are as defined in claim 1, a has a value of 1, 2 or 3 and b has a value of 0, 1 or 2 provided that in a mixture of fiber-reactive dyestuffs of formula (I) a+b is not greater than 3 on average.

9. A fiber-reactive dyestuff according to claim 8 or a salt thereof having the formula

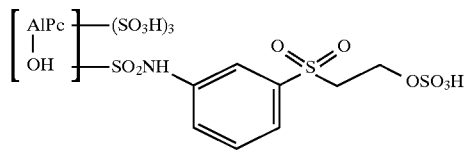

10. A process of forming a fiber-reactive dyestuff according to claim 1 or a salt thereof wherein D is —$SO_2NR_a$—A—$SO_2$—B comprising the steps of reacting a compound of the formula (Ia)

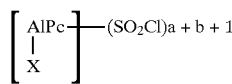

with one equivalent of a compound of the formula $HNR_a$—A—$SO_2$—B and b equivalents of a compound of the formula

$HNR_1R_2$ and thereafter hydrolysing the remaining $SO_2Cl$ group or groups.

11. A process of forming a fiber-reactive dyestuff according to claim 1 or a salt thereof wherein D is a group

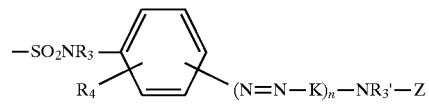

comprising the step of reacting a compound of formula II

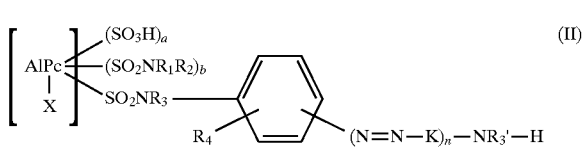         (II)

is condensed with a compound of formula III

Z—Hal         III, wherein Hal is fluorine or chlorine, or with a mixture of such compounds of formula III.

12. A process according to claim 11 wherein Z is $Z_1$.

13. A process of dyeing or printing hydroxy-group-containing or nitrogen-containing organic substrates wherein the dyeing or printing is carried out with a fiber-reactive dyestuff according to claim 1 or a salt thereof.

14. A process according to claim 13 wherein the hydroxy-group-containing or nitrogen-containing organic substrates consist of or contain cotton.

15. A hydroxy-group-containing or nitrogen-containing organic substrate dyed or printed with a fiber-reactive dyestuff according to claim 1 or a salt thereof.

16. A hydroxy-group-containing or nitrogen-containing organic substrate according to claim 15 which consists of or contains cotton.

17. A fiber-reactive dyestuff according to claim 1 wherein b is 0 and n is 1.

18. A fiber-reactive dyestuff according to claim 1 or a salt thereof wherein b is 0, n is 0, and Z is selected from a radical of the formula $Z_1$ to $Z_9$,

         ($Z_1$)

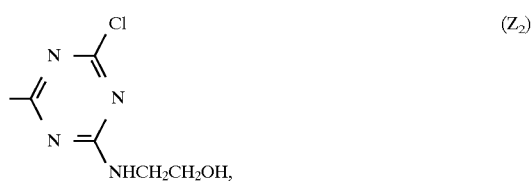         ($Z_2$)

-continued
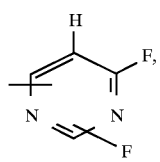 (Z₃)
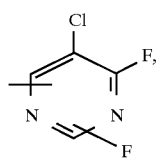 (Z₄)
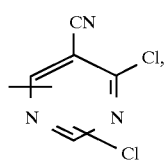 (Z₅)
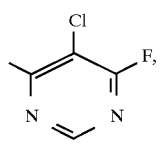 (Z₆)
-continued
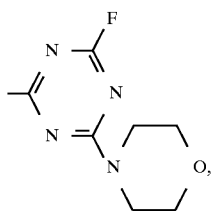 (Z₇)
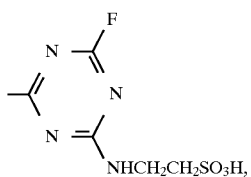 (Z₈)
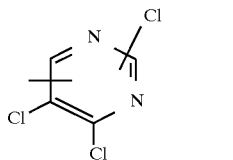 (Z₉)
* * * * *